(12) United States Patent
Chapman et al.

(10) Patent No.: US 10,284,740 B1
(45) Date of Patent: May 7, 2019

(54) COPY IDENTIFICATION WITH ULTRAVIOLET LIGHT EXPOSURE

(71) Applicant: Xerox Corporation, Norwalk, CT (US)

(72) Inventors: Edward N. Chapman, Rochester, NY (US); Paul R. Conlon, South Bristol, NY (US); Lee C. Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/852,003

(22) Filed: Dec. 22, 2017

(51) Int. Cl.
  *H04N 1/028* (2006.01)
  *H04N 1/40* (2006.01)
  *B41M 3/14* (2006.01)

(52) U.S. Cl.
  CPC ........ *H04N 1/02825* (2013.01); *B41M 3/148* (2013.01); *H04N 1/40056* (2013.01); *H04N 2201/0081* (2013.01)

(58) Field of Classification Search
  CPC ... H04N 2201/0081; H04N 2201/0082; H04N 2201/0091; H04N 2201/0094
  See application file for complete search history.

(56) References Cited

U.S. PATENT DOCUMENTS

| 8,405,882 | B2 | 3/2013 | Cole et al. |
| 8,743,425 | B2 | 6/2014 | Simske et al. |
| 9,092,858 | B2 | 7/2015 | Simske et al. |
| 2006/0230273 | A1* | 10/2006 | Crichton ............... G03G 15/50 713/176 |
| 2007/0241554 | A1* | 10/2007 | Wicker .................. G07D 7/12 283/93 |
| 2007/0262579 | A1* | 11/2007 | Bala ....................... B41M 3/144 283/92 |
| 2007/0264476 | A1* | 11/2007 | Bala ....................... B41M 3/144 428/195.1 |
| 2007/0268511 | A1* | 11/2007 | Crichton ................ B41M 1/18 358/1.14 |
| 2009/0122349 | A1* | 5/2009 | Bala ................... H04N 1/32203 358/3.28 |

(Continued)

FOREIGN PATENT DOCUMENTS

WO   2010147951 A1   12/2010

OTHER PUBLICATIONS https://forums.adobe.com/thread/1559820, Copyright Adobe Community, Retrieved on Oct. 25, 2017, pp. 1-3.

*Primary Examiner* — Ted W Barnes
(74) *Attorney, Agent, or Firm* — Gibb & Riley, LLC

(57) ABSTRACT

An original has a first pattern on and a second pattern, and the first pattern and the second pattern include relatively lighter markings within a relatively darker background. The relatively lighter markings appear at a first spacing interval in the first pattern, and at a larger second spacing interval in the second pattern. The first pattern and the second pattern cover and equally block a region of the original from reflecting ultraviolet light. A scanner is only capable of detecting patterns of markings having a spacing interval larger than the first spacing interval, which causes a copy of the original to not include the relatively lighter markings appearing at the first spacing interval. Thus, the copy lacks markings at locations corresponding to where the relatively lighter markings appear at the first spacing interval in the original. The copy reflects the ultraviolet light more where the copy lacks markings.

20 Claims, 8 Drawing Sheets

(56) References Cited

U.S. PATENT DOCUMENTS

| | | | |
|---|---|---|---|
| 2009/0180152 A1* | 7/2009 | Bala | H04N 1/387 358/3.28 |
| 2009/0201321 A1* | 8/2009 | Halfyard | B41J 3/546 347/2 |
| 2009/0237682 A1* | 9/2009 | Bala | H04N 1/6033 358/1.9 |
| 2010/0040282 A1* | 2/2010 | Bala | G06K 9/38 382/165 |
| 2010/0150433 A1* | 6/2010 | Wang | H04N 1/00864 382/162 |
| 2010/0157377 A1* | 6/2010 | Zhao | B41M 3/144 358/3.28 |
| 2010/0239831 A1* | 9/2010 | Eschbach | B41M 3/144 428/199 |
| 2011/0298204 A1* | 12/2011 | Eschbach | B41M 3/144 283/67 |
| 2013/0215472 A1* | 8/2013 | Rossier | H04N 1/4055 358/3.06 |
| 2013/0300101 A1* | 11/2013 | Wicker | G07D 7/06 283/67 |
| 2013/0306737 A1* | 11/2013 | Freeman | G06K 19/06037 235/488 |
| 2014/0339808 A1* | 11/2014 | Pawlik | G07D 7/128 283/85 |

\* cited by examiner

COPY IDENTIFICATION WITH ULTRAVIOLET LIGHT EXPOSURE

BACKGROUND

Systems and methods herein generally relate to document security, and more specifically to copy identification provided with ultraviolet light exposure which reveals pantographs.

Pantographs are elements of the document that do not appear in the original, but do appear in a copy of the original. More specifically, complementary patterns are printed in the original. However, differences in these patterns are generally too small to seen by human without magnification, and therefore the different patterns simply appear as a shaded area of an original. When the original is copied, the scanner interprets these different patterns differently, which causes the patterns to be printed differently on the copy (e.g., metameric pairs of patterns), and this produces some form of pantograph or other mark on the copy that is easily seen by a human without magnification.

SUMMARY

Methods herein provide a pantograph mark that is visible only in the copy of an original, and only when the copy is viewed under ultraviolet light; however, the methods and systems herein produce this ultraviolet light-only detectable pantograph mark using standard copy paper and standard inks and toners.

More specifically, methods herein determine the minimum resolution (or MTF (modulation transfer function)) of a scanner, or industry average scanner, that will be used to make a copy of an original. Then, the methods herein establish a first pattern and a second pattern. The first pattern and the second pattern include relatively lighter markings within a relatively darker background. In this processing, the relatively lighter markings are established to appear at the first spacing interval in the first pattern, and the relatively lighter markings are established to appear at the second spacing interval in the second pattern.

The first pattern and the second pattern are then added to a document (where the first pattern is within the second pattern, but the first pattern is positioned in locations distinct from the second pattern so that the patterns do not overlap, but they do form a continuous printed area) and the document is printed as an original on a first sheet of print media using a printer. Thus, the relatively lighter markings appear at the first spacing interval in the first pattern, while the relatively lighter markings appear at the second spacing interval (that is larger than the first spacing interval) in the second pattern. In other words, the relatively lighter markings in the first pattern are closer together and occur at a higher frequency relative to the frequency at which the relatively lighter markings occur in the second pattern (which are further apart).

The region of the first sheet of print media where the first and second patterns are printed is fully covered and equally block the underlying first sheet of print media from reflecting ultraviolet light. The relatively darker background of the first and second patterns contains the same pattern of markings and uses the same marking material, and therefore appears continuous in the first and second patterns to a human observer.

These processes scan the original to produce a scanned image using a scanner. However, the scanner's minimum resolution limit (or MTF) only allows the scanner to detect marks that have a pattern below the scanner's maximum frequency (because the scanner's limited resolution prevents the scanner from detecting markings that are spaced too closely together). In this way, the scanner acts as a low pass filter for the methods and systems herein.

Because of the known resolution limits of the scanner (or average scanner) the different frequencies (spacings) of the relatively lighter markings in the first and second patterns were established so that the scanner can only be capable of detecting patterns of markings having a spacing interval larger than the first spacing interval. This causes the scanned image to only include the relatively lighter markings appearing at the larger second spacing interval of the second pattern, and not include the relatively lighter markings appearing at the smaller first spacing interval of the first pattern.

These methods then print the scanned image on a second sheet of the same, or similar, print media to produce a copy of the original. As noted above, the scanned image does not include the relatively lighter markings appearing at the (smaller, higher frequency) first spacing interval of the first pattern (because the scanner could not detect such markings); and, therefore, the printed copy lacks markings at locations corresponding to where the relatively lighter markings appear at the first spacing interval in the original. The locations where the copy lacks the relatively lighter markings can be thought of as "holes" or missing spots in the otherwise continuous and identical area where the relatively darker background of the first and second patterns is printed, because no marking material (ink or toner) will cover the second sheet of print media at the locations where the copy lacks the relatively lighter markings, allowing the existing fluorescence characteristics of the second sheet of print media to reflect/fluoresce the ultraviolet light where such holes or missing spots exist.

These methods can then expose the copy to ultraviolet light. Again, the locations where the relatively lighter markings appear at the first spacing interval do not receive toner or ink when the copy is printed, which leaves those locations of the second sheet of print media of the copy exposed, allowing those locations to reflect/fluoresce the ultraviolet light. Therefore, where the copy lacks markings (where the holes are located) ultraviolet light is reflected.

However, the first pattern and the second pattern otherwise block the second sheet of print media of the copy from reflecting/fluorescing ultraviolet light, causing the ultraviolet light to be more strongly reflected where the holes or missing spots are located in the copy. In contrast, all of the first pattern and the second pattern on the original cover and equally block a region of the first sheet of print media from as strongly reflecting/fluorescing ultraviolet light (because the original does not contain any holes or missing spots).

Therefore, the first pattern and the second pattern on the original appear the same to a human observer when the original is exposed to the ultraviolet light (because there are no unprinted holes or missing spots on the original). However, the ultraviolet light reflects from the second sheet of print media where the copy lacks the markings (where the unprinted locations (holes or missing spots) are located), and this causes the first pattern and the second pattern to appear different from one another to a human observer when the copy is exposed to the ultraviolet light. In addition, the shape differences between the first pattern and the second pattern forms the pantograph mark (such as the word "copy" or "void"). Therefore, shape differences between a first area covered by the first pattern and a second area covered by the second pattern forms a complementary pair in the region covered by the first and second patterns, and the metameric pair in the copy comprises a pantograph that is only visible under magnification or ultraviolet light.

In addition, the relatively lighter markings are printed using a light color (such as beige, white, yellow, etc.) matching the sheets of print media, or at least a color that is more similar to the sheets of print media relative to the relatively darker background of the first and second patterns. Therefore, these methods can expose the copy to white light without revealing the hidden pantograph (where "white light" here means human-visible light such as daylight, artificial light sources (indoor/outdoor lights, mobile light sources), and is different from infrared light, ultraviolet light, etc.).

More specifically, the relatively lighter markings in the second pattern on the copy appear the same as locations where the copy lacks markings (to a human observer when the copy is exposed to the white light) because of the color similarity of the sheets of print media and the relatively lighter markings. In other words, while the first pattern on the copy lacks toner or ink in the unprinted hole or missing spot locations, the exposed portions of the second sheet of print media in the holes or missing spots of the copy will appear the same as (or similar to) the printed relatively lighter markings in the second pattern on the copy in white light because the same are similar colors. This causes the first and second patterns on the copy to appear similar in white light, and prevents the hidden pantograph mark from being visible when the copy is exposed to white light.

In view of this, the first and second patterns appear the same when the copy is viewed with white light (and such differences are only visible when the copy is viewed with ultraviolet light). Stated differently, the unmagnified pantograph mark is not visible to a human observer when the original or the copy is exposed to white light, and similarly the mark is not visible to a human observer when the original is exposed to the ultraviolet light. However, the unmagnified pantograph mark is visible to a human observer when the copy is exposed to the ultraviolet light because the unprinted locations in the first pattern (holes), which were spaced too closely to be detected by the scanner, expose the underlying second sheet of print media and cause the ultraviolet light to reflect/fluoresce more from the exposed locations of the second sheet of print media.

Thus, the methods herein produce an ultraviolet light-only detectable pantograph mark using only standard copy paper and standard inks and toners. This occurs because the original and the copy are printed on sheets of media capable of reflecting/fluorescing ultraviolet light (most standard copy paper is highly reflective of ultraviolet light), only using marking materials capable of being seen in white light (e.g., cyan, magenta, yellow, black (CMYK); red, green, blue (RGB), etc.).

Various systems herein include (among other components) a processor, a printer operatively connected to the processor, a scanner, capable of scanning sheets output by the printer, an ultraviolet light source capable of illuminating sheets output by the printer, a white light source capable of illuminating sheets output by the printer, etc.

The processor is capable of determining the minimum resolution (or MTF) of the scanner, setting a first spacing interval below the minimum scanner resolution (or MTF), and setting a second spacing interval above the minimum scanner resolution (or MTF). With this, the processor is capable of establishing a first pattern and a second pattern. The first pattern and the second pattern include relatively lighter markings within a relatively darker background. Further, the relatively lighter markings are established to appear at the first spacing interval in the first pattern, the relatively lighter markings are established to appear at the second spacing interval in the second pattern.

Additionally, the processor is capable of adding the first pattern within the second pattern to a document (again, the first pattern is within the second pattern, but the first pattern is positioned in locations distinct from the second pattern so that the patterns do not overlap). The processor is capable of controlling the printer to print the document on a first sheet of print media to print an original by printing the first pattern within the second pattern on the original. The relatively darker background contains the same pattern of markings and uses the same marking material in the first pattern and the second pattern. The first pattern and the second pattern cover and equally block a region of the first sheet of print media from reflecting/fluorescing ultraviolet light.

The scanner is capable of scanning the original to produce a scanned image. The minimum resolution of a scanner limits the scanner to only be capable of detecting patterns of markings having a spacing interval larger than the first spacing interval, which causes the scanned image to not include the relatively lighter markings appearing at the first spacing interval (but the scanner does detect the relatively lighter markings appearing at the second spacing interval in the second pattern).

The printer is also capable of printing the scanned image on a second sheet of the same, or similar, print media to produce a copy of the original. The copy lacks markings at locations corresponding to where the relatively lighter markings appear at the first spacing interval in the original. The ultraviolet light source is capable of exposing the copy to ultraviolet light. The second sheet of print media strongly reflects the ultraviolet light where the copy lacks markings. The original and the copy are printed on sheets of media capable of reflecting/fluorescing ultraviolet light, only using marking materials capable of being seen in white light.

The relatively lighter markings have a color more similar to sheets of media used to print the original and the copy, relative to the relatively darker background. Also, the white light source is capable of exposing the copy to white light. The relatively lighter markings in the second pattern on the copy appear the same as locations where the copy lacks markings to a human observer when the copy is exposed to the white light, because the relatively lighter markings have a color similar to the sheets of media and are not distinguishable therefrom.

Thus, shape differences between the first pattern and the second pattern form a pantograph mark. The pantograph mark is not visible to a human observer when the original or the copy is exposed to white light, and the pantograph mark is not visible to a human observer when the original is exposed to the ultraviolet light. However, the pantograph mark is visible to a human observer when the copy is exposed to the ultraviolet light. More specifically, the shape differences between a first area covered by the first pattern and a second area covered by the second pattern forms a complementary pair in the region covered by the first and second patterns, and the metameric pair in the copy comprises a pantograph.

Thus, the systems herein produce an ultraviolet light-only detectable pantograph mark using only standard copy paper and standard inks and toners. This occurs because the original and the copy are printed on sheets of media capable of reflecting/fluorescing ultraviolet light (most standard copy paper is highly reflective of ultraviolet light), only using marking materials capable of being seen in white light (e.g., cyan, magenta, yellow, black (CMYK); red, green, blue (RGB), etc.).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
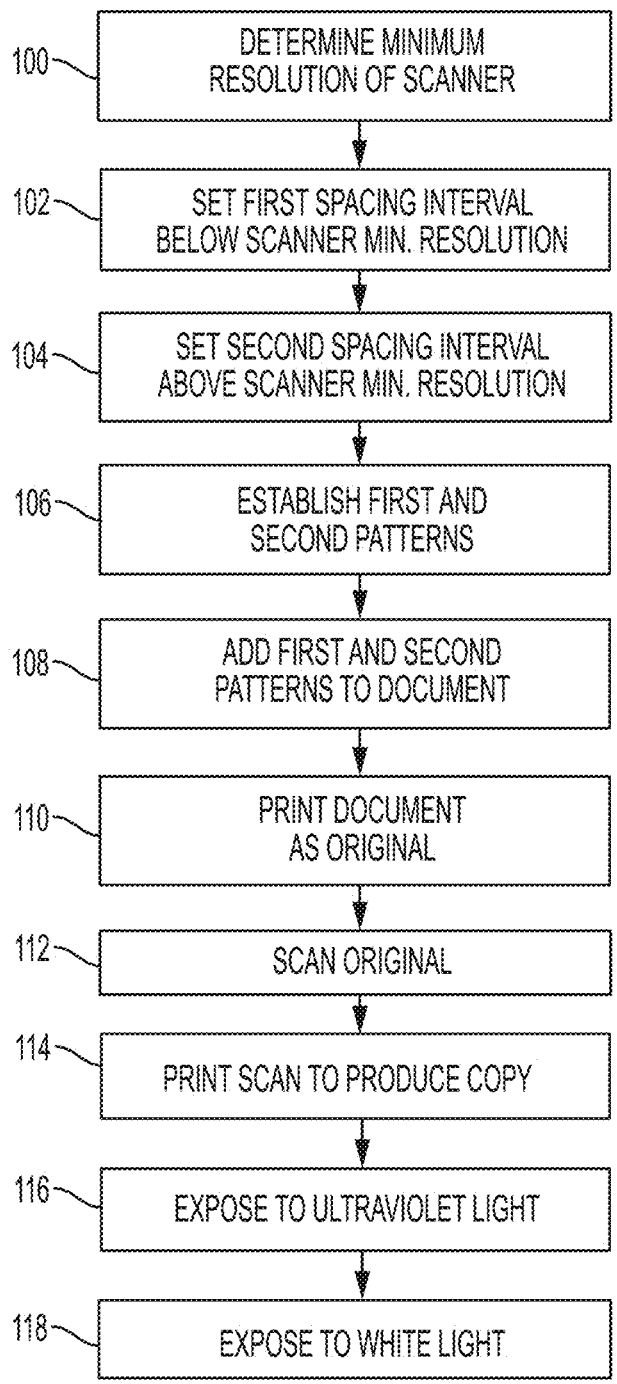
FIG. 1 is a flow diagram of various methods herein.

The systems and methods herein provide a pantograph mark that is visible only in the copy of an original, and only when the copy is viewed under ultraviolet light; however, the methods and systems herein produce this ultraviolet light-only detectable pantograph mark using standard copy paper and standard inks and toners.

In order to accomplish the foregoing, the methods herein rely upon the scanner to function as a low frequency pass filter, because scanners are unable to detect printed marks (light spots) that are spaced below the scanner's minimum resolution (or below the scanners MTF (modulation transfer function)). Some of the spots printed on the original are spaced above the scanner's minimum resolution (below the maximum frequency), while other spots are below the scanner's minimum resolution (above the maximum frequency).

There is a difference between the pattern of such spots, which forms a hidden pattern; however, the spots are small enough to appear as a uniform shade on the original, preventing the hidden pattern from appearing to a human observer viewing the original without magnification (in all lighting conditions).

More specifically, such lighter spots are printed within a darker pattern of other marks. The spots are printed using a lighter color relative to the darker pattern, and the spots are small enough and closely spaced enough to not appear distinct within the darker pattern to a human observer viewing the original without magnification; but instead the spots merely lighten the shade of the darker pattern to such a viewer. In other words, the darker pattern and the lighter closely spaced spots appear as a uniform shaded area of the original to a human observer viewing the original without magnification.

The spots printed on the original that the scanner does not detect, do not print on a copy of the original, and this causes such missing spots to be area on the copy that are devoid of ink or toner, exposing the underlying print media and allowing the standard fluorescence of the print media to reflect/fluoresce ultraviolet light in these areas of the copy. This reveals the hidden pattern within the otherwise uniform shaded area where the missing spots are located.

The original has printed spots where the missing spots that are located in the copy and, therefore, the original will not reveal the hidden pattern that the copy does, when the original is exposed to ultraviolet light. Additionally, the spots that the scanner is able to detect (those spots spaced above the scanner's minimum resolution), which for convenience are sometimes referred to here as "non-missing spots" to distinguish them from the missing spots, are printed on the copy using a color that is the same as (or close to) the color of the underlying media.

Therefore, when the copy is exposed to white light, the hidden pattern is not revealed in the copy, because the missing spots and the non-missing spots are the same color (or close colors). Again, the spots are small enough to appear as a uniform shade, and the white light makes the missing and non-missing spots to appear the same on the copy, which prevents the hidden pattern from appearing to a human observer viewing the copy in white light without magnification. This allows the methods and systems herein to provide a pantograph mark that is visible only in the copy of the original, and only when the copy is viewed under ultraviolet light (using standard copy paper and standard inks and toners).

FIG. 1 is flowchart illustrating exemplary methods herein. In item 100 in FIG. 1, these methods determine the minimum resolution of the scanner. For example, the scanner resolution can be manually supplied, the scanner resolution can be automatically determined by processor communication with the scanner, the scanner resolution can be set according to prevailing industry standards for scanner resolution (and periodically updated as scanner resolutions generally increase), etc. This allows the methods herein to set a first spacing interval below the minimum scanner resolution (in item 102), and to set a second spacing interval above the minimum scanner resolution (in item 104).

In item 106, the methods herein establish first and second patterns. The first and second patterns include relatively lighter markings within a relatively darker background. The first and second patterns are established by using the first spacing interval to set how frequently (how often per linear unit) the lighter markings appear in the first pattern; and correspondingly, using the second spacing interval to set how frequently the lighter markings appear in the second pattern. The darker background is the same color, pattern shape, pattern frequency, etc., in the first and second patterns, and the only difference between the first and second patterns is the spacing/frequency of the relatively lighter markings.

Therefore, the different frequencies (spacings) of the relatively lighter markings (spots) in the first and second patterns are established in items 106 in FIG. 1 so that the scanner will only detect the relatively lighter markings in the second pattern, that are at the larger spaced (lower frequency) second spacing interval, and not those in the first pattern. This causes the later scanned image used to produce the copy to only include the relatively lighter markings appearing at the larger second spacing interval of the second pattern, and not include the relatively lighter markings appearing at the smaller first spacing interval of the first pattern (e.g., not include the missing spots).

After establishing the different frequencies (spacings) of the relatively lighter markings in the first and second patterns in item 106, these methods add the first pattern positioned within the second pattern to the electronic document (as a complementary pair of non-overlapping shapes) as shown in item 108. While the first pattern is positioned within the second pattern in item 108, the first pattern is positioned in complementary locations distinct from the second pattern, so that the patterns do not overlap. Thus, shape differences between a first area covered by the first pattern and a second area covered by the second pattern forms a complementary pair in the region of the original continuously covered by the first and second patterns, and the metameric pair comprises the pantograph (showing "void"; "copy"; etc.) in the copy.

Next, in item 110, the methods herein print the electronic document on a first sheet of print media using a printer, and the printed item that is output is referred to herein as an "original" for convenience of discussion. Within the printed original, the first and second patterns include the relatively lighter markings (spots) within the relatively darker pattern of the two patterns that forms a uniform background for the relatively lighter markings. However, because a region of the first sheet of print media is fully covered by the first pattern and the second pattern, such patterns cover and equally block that region of the first sheet of print media from differently reflecting/fluorescing ultraviolet light, keeping the pantograph hidden in the original.

In item 112, these processes scan the original to produce a scanned image using a scanner. However, the scanner has a limited resolution, allowing the scanner to only detect marks that have a pattern below the scanner's maximum frequency (because the scanner's limited resolution prevents the scanner from detecting markings that are spaced too closely together). In this way, the scanner acts as a low pass filter for the methods and systems herein.

These methods then print the scanned image on a second sheet of the same or similar print media in item 114 to produce a copy of the original (which is referred to herein as a "copy" for convenience of discussion). Any form of print media can be used to print the original or the copy, so long as the print media has not been treated to not reflect/fluoresce ultraviolet light, and specialized print media is not required (but can be used), and the print media can be copy paper, bond, cardstock, photo paper, transparencies, plastic, metal, polymers, etc.).

As noted above, the scanned image does not include the relatively lighter markings appearing at the (smaller, higher frequency) first spacing interval of the first pattern (because the scanner could not detect such markings); and, therefore, the printed copy produced in item 114 lacks markings at locations corresponding to where the relatively lighter markings appear at the first spacing interval in the original. The locations where the second sheet of print media lacks the relatively lighter markings can be thought of as "holes" or missing spots in the otherwise continuous area where the relatively darker background of the first and second patterns is printed, because no marking material (ink or toner) will cover the second sheet of print media at the missing spots where the copy lacks the relatively lighter markings, allowing the print media to reflect/fluoresce the ultraviolet light only where such missing spots exist.

These methods can then expose the copy (and the original) to ultraviolet light in item 116. Again, the missing spot locations where the relatively lighter markings appear at the first spacing interval do not receive toner or ink when the copy is printed in item 114, which leaves those locations of the second sheet of print media of the copy exposed, allowing those locations to differently reflect/fluoresce the ultraviolet light, revealing the hidden pantograph. Therefore, where the copy lacks markings (where the holes or missing spots are located) ultraviolet light is reflected differently in item 116, revealing the hidden pantograph formed by the difference of the first and second patterns.

However, the first pattern and the second pattern otherwise block the second sheet of the print media of the copy from reflecting/fluorescing ultraviolet light, causing the ultraviolet light to be reflected more strongly in the missing spots in the first pattern in the copy in item 116. In contrast, all of the first pattern and the second pattern on the original cover and equally block a region of the first sheet of print media from reflecting/fluorescing ultraviolet light (because the original does not contain any holes), if the original is also exposed to the ultraviolet light in item 116, keeping the pantograph hidden in the original.

Therefore, the first pattern and the second pattern on the original appear the same to a human observer when the original is exposed to the ultraviolet light (because there are no unprinted holes or missing spots on the original) in item 116. However, the ultraviolet light reflects from the second sheet of print media where the copy lacks the markings (where the unprinted locations (holes, missing spots) are located), and this causes the first pattern and the second pattern to appear different from one another to a human observer when the copy is exposed to the ultraviolet light in item 116.

In addition, the shape differences between the areas occupied by the first pattern and the second pattern form the pantograph mark (such as the word "copy" or "void"). Therefore, shape differences between a first area covered by the first pattern and a second area covered by the second pattern forms a complementary pair in the region of the original covered by the first and second patterns, and the metameric pair comprises a pantograph that is only revealed when the copy is exposed to ultraviolet light.

Also, the relatively lighter markings (non-missing spots) are printed using a color (such as beige, white, yellow, etc.) matching the print media in item 110 and 114, or at least a color that is more similar to the sheets of media than the relatively darker background of the first and second patterns. Therefore, these methods can also expose the copy (and the original) to white light in item 118 (where "white light" here means human-visible light such as daylight, artificial light sources (indoor/outdoor lights, mobile light sources), and is different from infrared light, ultraviolet light, etc.) without revealing the hidden pantograph.

This occurs because the relatively lighter markings in the second pattern (non-missing spots) on the copy are the same color as, and appear the same as, the missing spots to a human observer (when the copy is exposed to the white light in item 118). Thus, the missing spots appear the same as (or similar to) the non-missing spots on the copy, because the non-missing spots match the color of the sheets of print media. This causes the first and second patterns on the copy to appear similar in white light, and prevents pantograph mark from being visible when the copy is exposed to white light in item 118. In view of this, the first and second patterns appear the same when the copy is viewed with white light (and such differences are only visible when the copy is viewed with ultraviolet light). The relatively darker background contains the same pattern of markings and uses the same marking material in the first pattern and the second pattern, and therefore appears continuous to a human observer in all light conditions.

There is a distinction between white light and ultraviolet light. White light contains most (or all) human-visible colors, while ultraviolet light contains a limited number (or only one) human-visible color. Therefore, white light causes different colors to reflect from the original and the copy. This permits the color similarity of the non-missing spots and the second sheet of print media to appear the same, and to not reveal the hidden pantograph.

In contrast, the ultraviolet light will mostly show just light and dark areas in a violet color to humans, without much distinction between different colors (other than some difference between light and dark colors of ink/toner). However, the florescent characteristic of print media will reflect/fluoresce ultraviolet light much more than ink or toner (because standard inks and toners do not contain large amounts of florescent material). For example, print media can have 10×, 50×, 100×, etc., the fluorescence to ultraviolet light relative to standard inks and toners (e.g., RGB, CMYK, etc.). This causes exposed areas of print media to appear much brighter, relative to areas of the print media that are covered with ink or toner. Therefore, the difference between the first pattern of the copy which has exposed areas of print media (missing spots); and the second pattern of the copy, which does not have missing spots, is easily seen when the copy is exposed to ultraviolet light because the missing spots in the first pattern fluoresce greatly relative to the ink/toner in non-missing spots the second pattern.

Therefore, the unmagnified pantograph mark is not visible to a human observer (is hidden) when the original or the copy is exposed to white light in item 118, and similarly the mark is not visible to a human observer if the original is exposed to the ultraviolet light in item 114. However, the unmagnified pantograph mark is visible to a human observer (revealed) when the copy is exposed to the ultraviolet light in item 114 because the unprinted locations in the first pattern (holes) that were spaced too closely to be detected by the scanner expose the underlying print media and cause the ultraviolet light to reflect and fluoresce from the locations of exposed print media (e.g., from the holes or missing spots).

Thus, the methods herein produce an ultraviolet light-only detectable pantograph mark using only standard copy paper and standard inks and toners. This occurs because the original and the copy are printed on sheets of media capable of reflecting/fluorescing ultraviolet light (most standard copy paper is highly reflective of ultraviolet light), only using marking materials capable of being seen in white light (e.g., cyan, magenta, yellow, black (CMYK); red, green, blue (RGB), etc.).

Figure 2A:
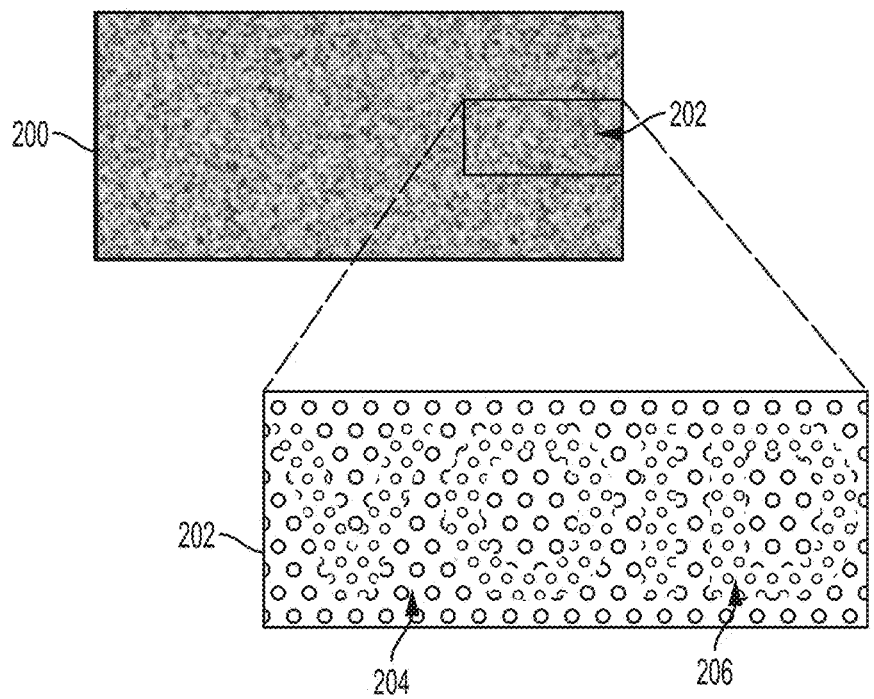
FIG. 2A-6B are schematic diagrams illustrating printing performed herein.
Figure 2B:
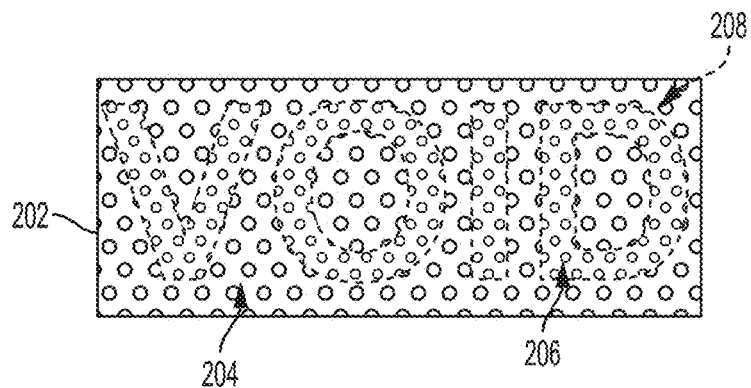

This is also shown schematically in FIGS. 2A-6B. FIG. 2A illustrates the document having the first and second patterns when printed on a first sheet of print media (the original 200). FIG. 2A also illustrates an expanded view of a portion of the original 200, which is a magnified portion 202. Slight differences between the first pattern 206 with the more closely spaced relatively lighter markings, and the second pattern 204 with the lower frequency relatively lighter markings can be seen in the magnified portion 202 shown in FIG. 2A.

In order to assist the reader of this disclosure in distinguishing the first pattern 206 from the second pattern 204 shown in FIG. 2A, an overlay 208 of dashed lines has been added to the magnified portion 202. The overlay 208 is not part of the magnified portion 202, but instead is only a part of this disclosure, and 208 is merely an illustration aid to demonstrate what is shown in FIG. 2A (in a similar way that the identification numerals and lead lines used in the drawings are not part of the printed original 200).

Therefore, as can be seen in FIG. 2A (potentially with the assistance of the overlay 208 shown in FIG. 2B), the first pattern 206 is positioned within the second pattern 204 (without overlapping the second pattern 204). Therefore, the first pattern 206 has the shape of the word "VOID." Correspondingly, the second pattern 204 forms the general background of the magnified portion 202, but is not present where the shape of the word "VOID" is located in FIG. 2B in order to allow the first pattern 206 to occupy that location within the magnified portion 202. Stated differently, the first pattern 206 and the second pattern 204 are complementary shapes and form a metameric pair in the copy that produces a pantograph of the word "VOID." The pantograph is not visible to a human observer when viewing the unmagnified original 200 (is hidden) because the relatively lighter markings 212, 214 are small enough and closely spaced enough to not be detected by a human observer; but can be seen in the magnified portion 202 shown in FIG. 2A.

Figure 2C:
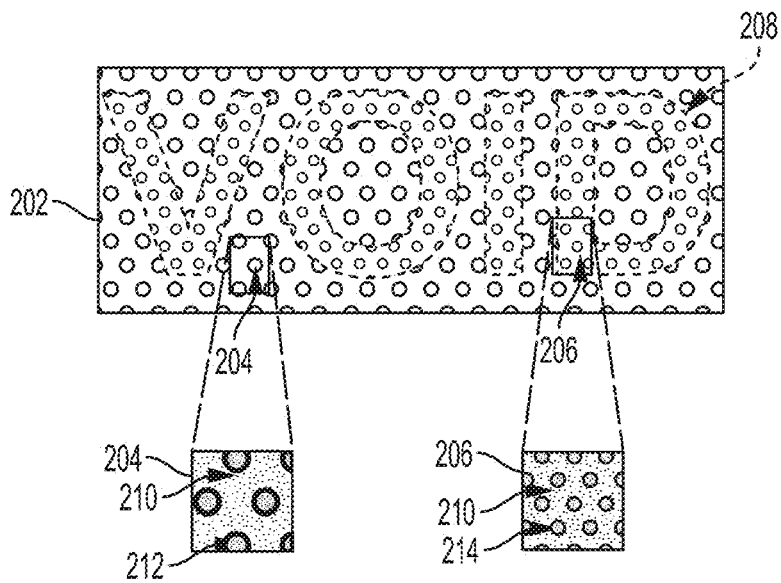

FIG. 2C illustrates magnified portions of the first pattern 206 and the second pattern 204, and maintains the overlay 208 as an aid to understanding the drawings. The magnified portions of the first pattern 206 and the second pattern 204 shown in FIG. 2C allow the relatively darker markings 210 and the relatively later markings 212, 214 to be more easily seen. More specifically, the first pattern 206 and the second pattern 204 include relatively lighter markings 212, 214 within a relatively darker background 210. The first and second patterns 206, 204 are established by using the first spacing interval to set how frequently the lighter markings 214 appear in the first pattern 206; and correspondingly, using the second spacing interval to set how frequently the lighter markings 212 appear in the second pattern 204. The darker background 210 is the same color, pattern shape, pattern frequency, etc., in the first and second patterns 206, 204, and the only difference between the first and second patterns 206, 204 is the spacing/frequency of the relatively lighter markings 212, 214.

While the first and second patterns 206, 204 are shown to cover the entire printed first sheet of print media in the original 200, the first and second patterns 206, 204 may only cover a small portion of the first sheet of print media (e.g., see FIG. 6B, discussed below). Similarly, while relatively darker markings 210 are shown in the drawings as being markedly dark, the relatively darker markings 210 could be quite light, and may only appear as a slightly shaded area in a document (e.g., see FIG. 6B, discussed below).

Figure 3A:
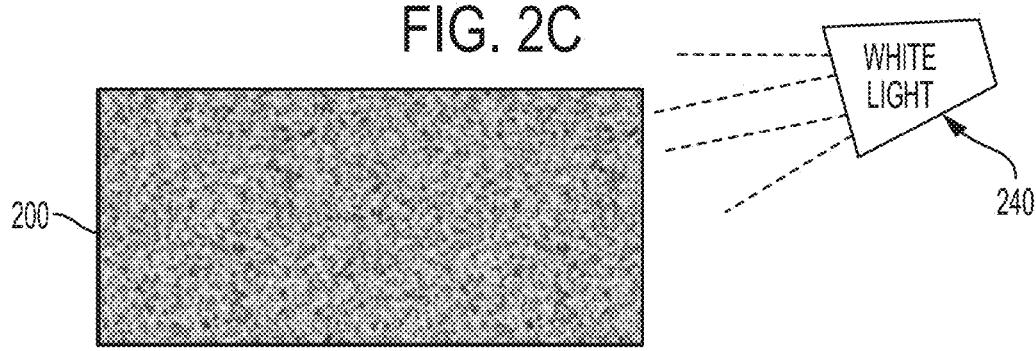
Figure 3B:
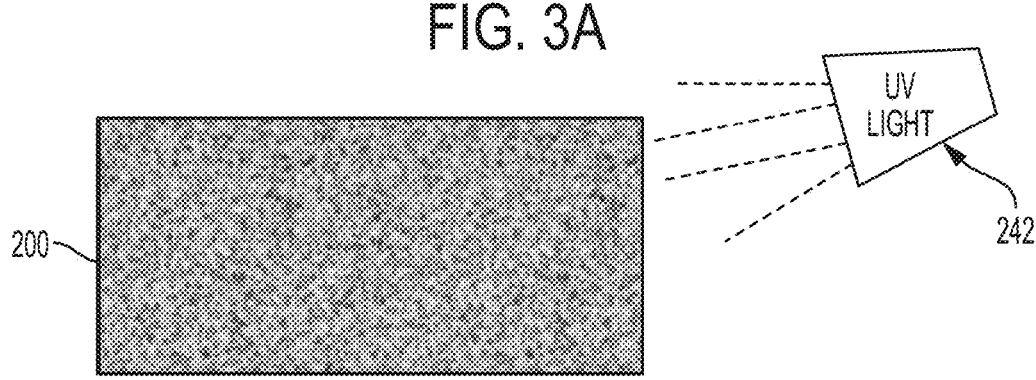

As shown in FIGS. 3A and 3B, when the unmagnified original 200 is viewed in white light 240 or ultraviolet light 242, the first and second patterns 206, 204 appear the same. This occurs because the relatively lighter markings 212, 214 are small enough and closely spaced enough to not be detected by a human observer (lacking magnification equipment). Instead, the relatively lighter markings 212, 214 merely serve to lighten the perceived color of the relatively darker markings 210.

Also, the relatively lighter markings 212, 214 and the relatively darker markings 210 are continuous where the first and second patterns 206, 204 are printed, which prevents any portions of the underlying first sheet of print media (paper, cardstock, plastic, etc.) from being visible. The marking material (inks, toners, etc.) used to print the continuous first and second patterns 206, 204 equally reflect the white light 240, and equally reflect/fluoresce the ultraviolet light 242; making the continuous first and second patterns 206, 204 appear as a consistent, uniform single pattern under each of the lighting conditions.

Therefore, while the different light sources 240, 242 will cause such patterns to have a different color (because the light sources 240, 242 are different colors), such light sources will not distinguish between the first and second patterns 206, 204 because the inks and toners used to print such patterns are the same between the first and second patterns 206, 204, producing a consistent, uniform single pattern under each light source 240, 242. Thus, because a region of the first sheet of print media is fully covered by the first pattern 206 and the second pattern 204, such patterns 206, 204 cover and equally block that region of the of the first sheet of print media from differently reflecting/fluorescing ultraviolet 242 or white 240 light, keeping the pantograph hidden in the original 200 under both lighting conditions.

Figure 4A:
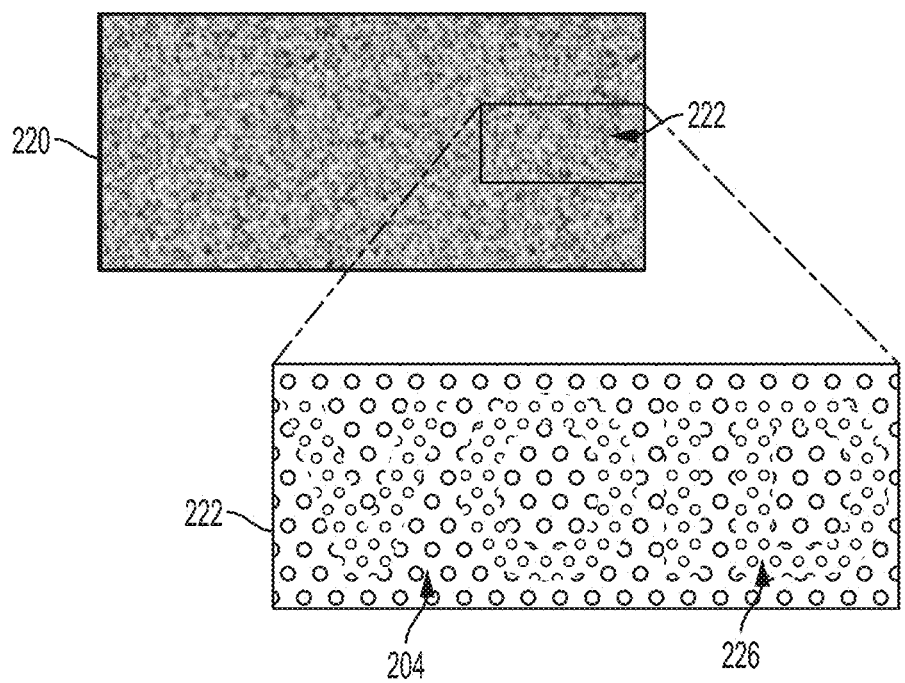

FIG. 4A similarly illustrates a copy 220 of the original 200 shown in FIG. 2A printed on a second sheet of print media. Also, FIG. 4A shows a magnified portion 222 of the copy 220. The magnified portion of the copy includes the same second pattern 204, but has a different first pattern 226.

As noted above, the different frequencies (spacing) of the relatively lighter markings 212, 214 (spots) in the first and second patterns 206, 204 are established so that the scanner used to make the copy 220 will only detect the relatively lighter markings in the second pattern 204, that are at the larger spaced (lower frequency) second spacing interval. This causes the scanned image used to produce the copy 220 in FIG. 4A to only include the relatively lighter markings 212 appearing at the larger second spacing interval of the second pattern, and not include the relatively lighter markings 214 appearing at the smaller first spacing interval of the first pattern (e.g., not include the missing spots). In this way, the scanner acts as a low pass filter for the methods and systems herein.

Figure 4B:
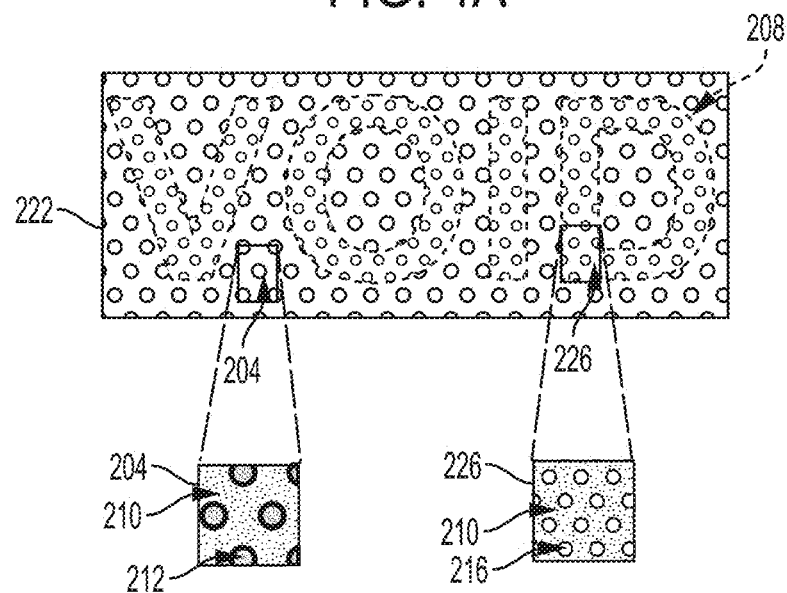

FIG. 4B includes the same illustrative overlay 208, and shows additionally magnified portions of the second pattern 204, and the first pattern 226 within the magnified portion 222 of the copy 220. As shown in FIG. 4B, the second sheet of print media lacks any markings at locations 216 corresponding to where the relatively lighter markings 214 appear at the first spacing interval in the original 200 (shown in FIG. 2C). The locations 216 where the second sheet of print media lacks the relatively lighter markings can be thought of as "holes" or missing spots in the otherwise continuous area where the relatively darker background of the first and second patterns 226, 204 is printed on the copy 220, because no marking material (ink or toner) will cover the second sheet of print media at the locations 216 where the copy lacks the relatively lighter markings, allowing the underlying second sheet of print media to reflect/fluoresce ultraviolet light more where such holes 216 exist.

Figure 5A:
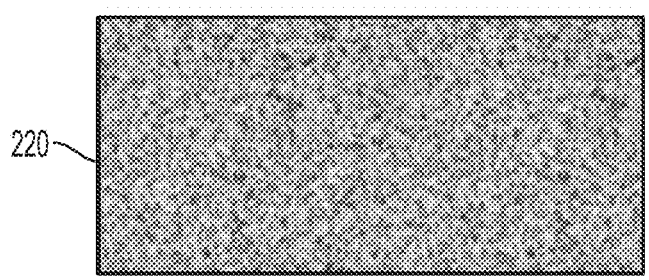
Figure 5A:
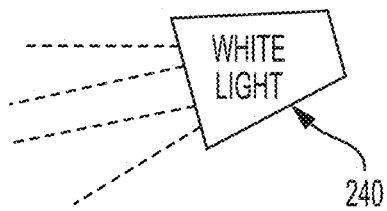

As shown in FIG. 5A, the first and second patterns appear the same when the copy is viewed with white light 240. This occurs because the relatively lighter markings 212 are printed using a color (such as beige, white, yellow, etc.) matching the print media, or at least that is more similar to the print media relative to the relatively darker background 210 of the first and second patterns 226, 204. Again, the "white light" here means human-visible light such as daylight, artificial light sources (indoor/outdoor lights, mobile light sources), and is different from infrared light, ultraviolet light, etc.).

More specifically, because the relatively lighter markings 212 are printed using a color matching or close to the sheets of print media, the relatively lighter markings 212 in the second pattern 204 on the copy 220 appear the same as locations 216 where the copy lacks markings (to a human observer when the copy 220 is exposed to the white light 240) because of the color similarity of the second sheet of print media and the relatively lighter markings 212. In other words, while the first pattern 226 on the copy lacks toner or ink in the unprinted locations 216 (where the relatively lighter markings 214 are located in the original 200) the exposed portion of the second sheet of print media in the unprinted locations 216 of the first pattern 226 on the copy 220 will reflect the color of the second sheet of print media and appear the same as (or similar to) the printed relatively lighter markings 212 in the second pattern 204 on the copy 220 that match the color of the print media, causing the first and second patterns 226, 204 on the copy 220 to appear similar in white light 240 (and preventing a pantograph mark from being visible when the copy 220 is exposed to white light 240).

Figure 5B:
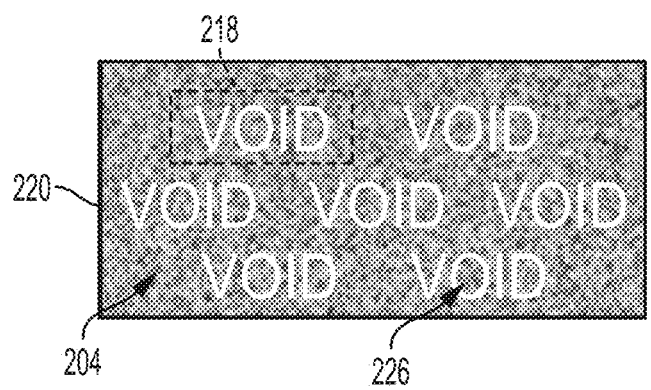
Figure 5B:
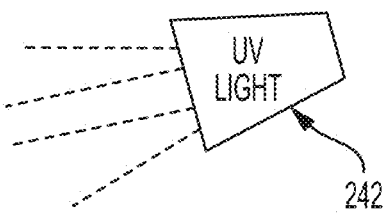

In view of this, the first and second patterns 226, 204 appear the same when the copy 220 is viewed with white light 240 (and such differences are only visible when the copy 220 is viewed with ultraviolet light 242, as shown in FIG. 5B). The relatively darker background 210 contains the same pattern of markings and uses the same marking material in the first pattern 226 and the second pattern 204, and therefore appears continuous to a human observer in all light conditions.

As shown in FIG. 5B, when the copy 220 is exposed to ultraviolet light 242 the pantograph 218 of the word "VOID" is revealed. This occurs because the holes or missing spots 216 within the copy 220 do not include any toner or ink, which leaves those locations 216 of the second sheet of print media of the copy 220 exposed, allowing those locations 216 to more strongly reflect/fluoresce the ultraviolet light 242, making the first pattern 226 appear different from the second pattern 204, and revealing the hidden pantograph 218. More specifically, where the copy lacks markings (where the holes or missing spots 216 are located) ultraviolet light 242 is more strongly reflected/fluoresced based on the fluorescence of the underlying print media (which is a stronger reflectance relative to inks or toners). However, the ink or toner used to print the relatively lighter markings 212 does not provide the same level of reflectance/fluorescence for ultraviolet light, making the first pattern 226 appear different from the second pattern 204 in the copy, and revealing the hidden pantograph 218 formed by the difference of the first and second patterns 226, 204.

Once again, standard print media (e.g., bulk copy paper that is generally provided in reams or on rolls) has a high fluorescence to ultraviolet light, that can be 10×, 50×, 100×, etc., the fluorescence to ultraviolet light provided by standard inks and toners (e.g., RGB, CMYK, etc.). The absence of ink or toner in the missing spots 116 in the copy 220 causes a relatively large difference in the brightness of the reflection/fluorescence of the ultraviolet light 242 between the first and second patterns 226, 204. Other than the holes or missing spots 216, the first pattern 226 and the second pattern 204 otherwise block the second sheet of print media of the copy 220 from reflecting/fluorescing the ultraviolet light 242, causing the ultraviolet light 242 to be reflected/fluoresced to a greater extent where the missing spots 216 are located. In contrast, all of the first pattern 206 and the second pattern 204 on the original 200 cover and equally block the first sheet of print media from as strongly reflecting/fluorescing the ultraviolet light 242 (because the original 200 does not contain any holes 216) keeping the pantograph hidden in the original.

Therefore, the first pattern 206 and the second pattern 204 on the original 200 appear the same to a human observer when the original 200 is exposed to the ultraviolet light 242 (because there are no unprinted holes 216 on the original 200). However, the ultraviolet light 242 more strongly reflects/fluoresces from the print media where the copy lacks the markings (where the unprinted locations (holes) 216 are located), and this causes the first pattern 226 and the second pattern 204 to appear different from one another to a human observer when the copy 220 is exposed to the ultraviolet light 242.

Again, the shape differences between the areas occupied by the first pattern 226 and the second pattern 204 form the pantograph mark 218 (such as the word "copy" or "void").

Therefore, shape differences between a first area covered by the first pattern 226 and a second area covered by the second pattern 204 forms a complementary pair in the region covered by the first and second patterns 226, 204, and the metameric pair comprises a pantograph that is only revealed when the copy 220 is exposed to ultraviolet light 242.

Therefore, the unmagnified pantograph mark 218 is not visible to a human observer (hidden) when the original 200 or the copy 220 is exposed to white light 240, and similarly the mark 218 is not visible to a human observer (hidden) if the original 200 is exposed to the ultraviolet light 242. However, the unmagnified pantograph mark 218 is visible to a human observer (revealed) when the copy 220 is exposed to the ultraviolet light 242 because the unprinted locations in the first pattern (holes) 216 that were spaced too closely to be detected by the scanner expose the underlying print media and cause the ultraviolet light 242 to more strongly reflect/fluoresce from the locations 216 of exposed print media (e.g., from the holes or missing spots 216).

Figure 6A:
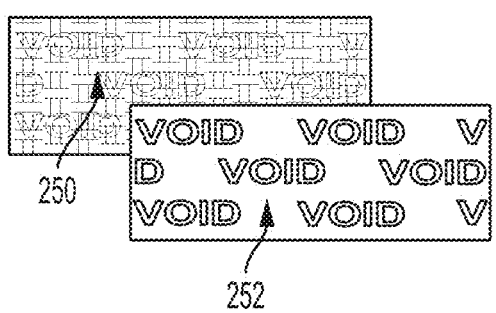
Figure 6B:
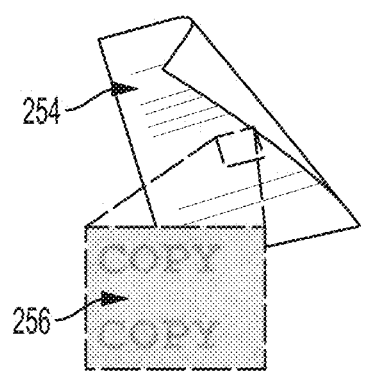

FIG. 6A illustrates an example of the back of a copy of a check (or other negotiable instrument) which does not show the pantograph under white light 250, but does show the pantograph under ultraviolet light 252. Similarly, FIG. 6B illustrates a copy of a document 254, which only reveals a pantograph in a portion 256 when exposed to ultraviolet light. Therefore, the first and second patterns can be printed on a full side of a document (FIG. 6A) or only on a small portion of the document (FIG. 6B). Additionally, the first and second patterns can form a dark shade on the document (FIG. 6A), or can form a very light shade (FIG. 6B). One ordinarily skilled in the art would understand that the foregoing are only examples to show the concepts herein, and that the methods and systems herein are applicable to any documents that could be secured with hidden shapes or words.

Figure 7:
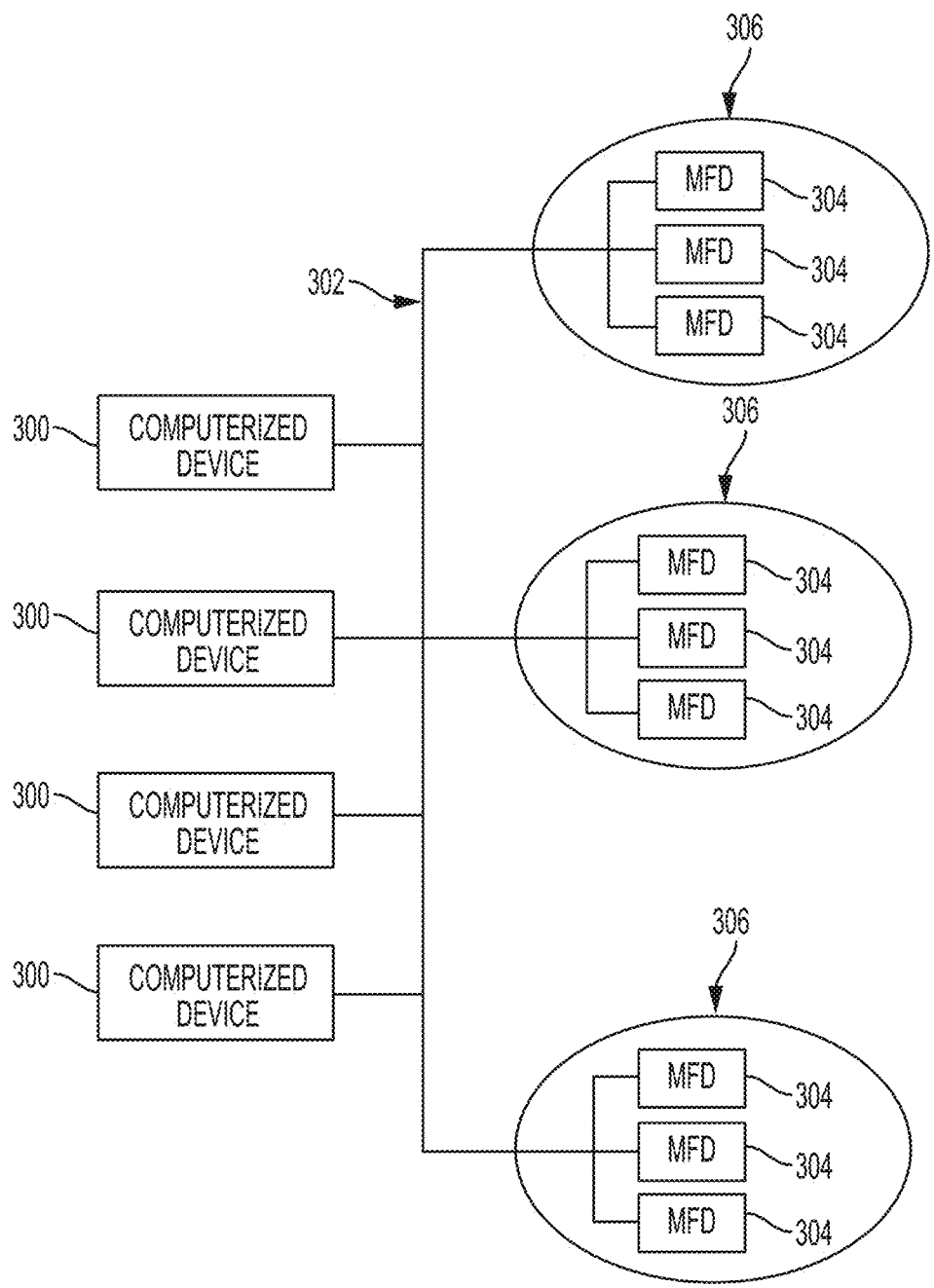
FIG. 7 is a schematic diagram illustrating systems herein.

As shown in FIG. 7, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 8:
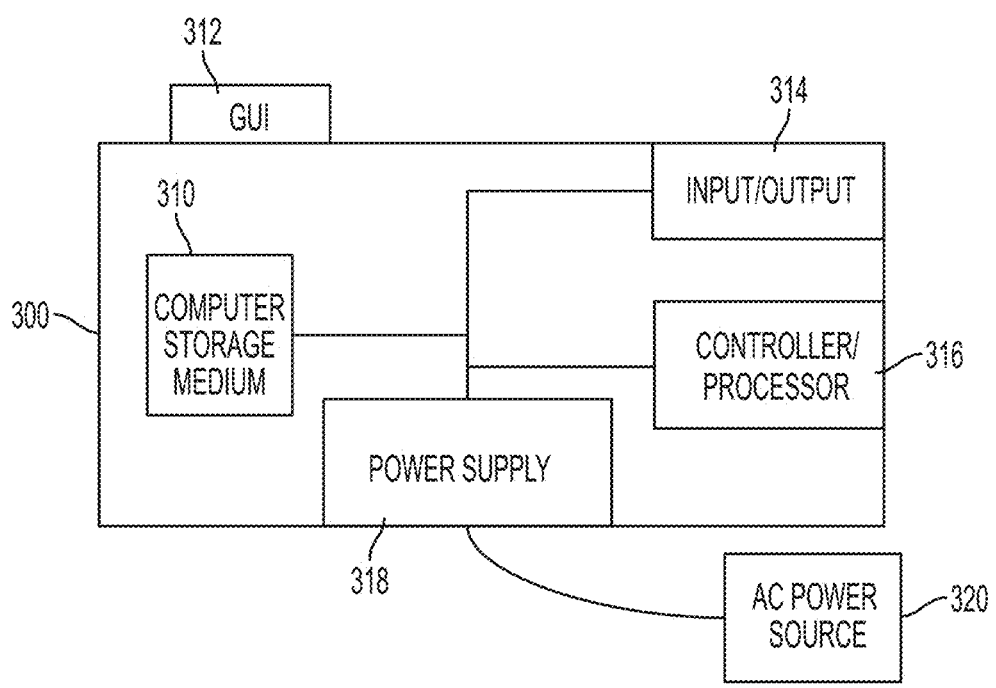
FIG. 8 is a schematic diagram illustrating a computerized device herein.

FIG. 8 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a graphical user interface (GUI) assembly 312. The user may receive messages, instructions, and menu options from, and enter instructions through, the graphical user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 8, a body housing has one or more functional components that operate on power supplied from an alternating current (AC) source 320 by the power supply 318. The power supply 318 can comprise a common power conversion unit, power storage element (e.g., a battery, etc), etc.

Figure 9:
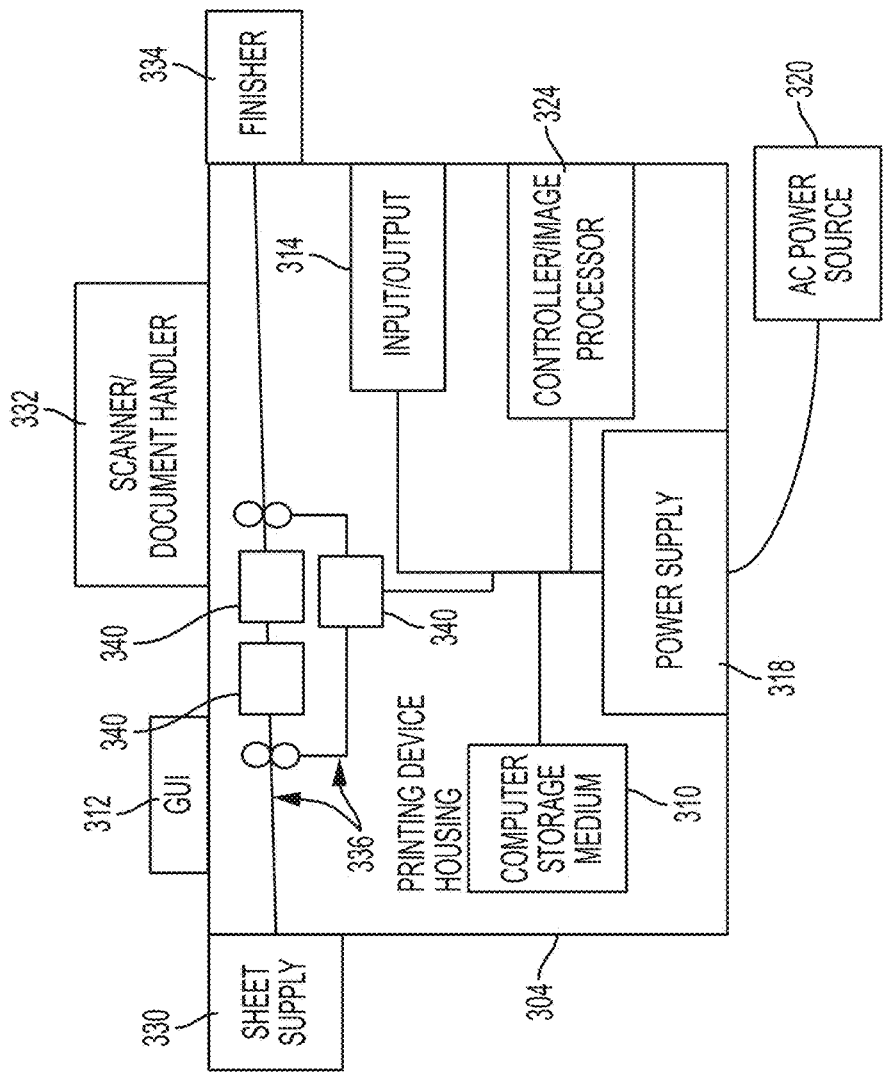
FIG. 9 is a schematic diagram illustrating a printing device herein.

FIG. 9 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing engines 340 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, systems described herein (e.g., FIG. 7, etc.) include (among other components) a processor 316, 324, a printer 304 operatively connected to the processor 316, 324, a scanner 332, capable of scanning sheets output by the printer 304, an ultraviolet light source 242 capable of illuminating sheets output by the printer 304, a white light source 240 capable of illuminating sheets output by the printer 304, etc.

The processor 316, 324 is capable of (either on a local basis for a single copier 304, or on a network-wide basis using remote computers 300 connected over a network 302) determining the minimum resolution of the scanner 332, setting a first spacing interval below the minimum scanner 332 resolution, and setting a second spacing interval above the minimum scanner 332 resolution. With this, the processor 316, 324 is capable of establishing a first pattern and a second pattern. The first pattern and the second pattern include relatively lighter markings within a relatively darker background. Further, the relatively lighter markings are established to appear at the first spacing interval in the first pattern, the relatively lighter markings are established to appear at the second spacing interval in the second pattern.

Additionally, the processor 316, 324 is capable of adding the first pattern within the second pattern to a document (again, the first pattern is within the second pattern, but the first pattern is positioned in locations distinct from the second pattern so that the patterns do not overlap). The processor 316, 324 is capable of controlling the printer 304 to print the document on a first sheet of print media to print an original by printing the first pattern within the second pattern on the original. The relatively darker background contains the same pattern of markings and uses the same marking material in the first pattern and the second pattern.

The first pattern and the second pattern cover and equally block a region of the first sheet of print media from reflecting ultraviolet light.

The scanner 332 is capable of scanning the original to produce a scanned image. The minimum resolution of a scanner 332 limits the scanner 332 to only be capable of detecting patterns of markings having a spacing interval larger than the first spacing interval, which causes the scanned image to not include the relatively lighter markings appearing at the first spacing interval (but the scanner 332 does detect the relatively lighter markings appearing at the second spacing interval in the second pattern).

The printer 304 is also capable of printing the scanned image on a second sheet of the same, or similar, print media to produce a copy of the original. The copy lacks markings at locations corresponding to where the relatively lighter markings appear at the first spacing interval in the original. The ultraviolet light source 242 is capable of exposing the copy to ultraviolet light. The second sheet of print media strongly reflects/fluoresces the ultraviolet light where the copy lacks markings. The original and the copy are printed on sheets of media capable of reflecting/fluorescing ultraviolet light, only using marking materials capable of being seen in white light.

The relatively lighter markings have a color more similar to sheets of media used to print the original and the copy, relative to the relatively darker background. Also, the white light source 240 is capable of exposing the copy to white light. The relatively lighter markings in the second pattern on the copy appear the same as locations where the copy lacks markings to a human observer when the copy is exposed to the white light, because the relatively lighter markings have a color similar to the sheets of media and are not distinguishable therefrom.

Thus, shape differences between the first pattern and the second pattern form a pantograph mark. The pantograph mark is not visible to a human observer when the original or the copy is exposed to white light, and the pantograph mark is not visible to a human observer when the original is exposed to the ultraviolet light. However, the pantograph mark is visible to a human observer when the copy is exposed to the ultraviolet light. More specifically, the shape differences between a first area covered by the first pattern and a second area covered by the second pattern forms a complementary pair in the region covered by the first and second patterns, and the metameric pair comprises a pantograph in the copy.

Thus, the systems (FIG. 7) herein produce an ultraviolet light-only detectable pantograph mark using only standard copy paper and standard inks and toners. This occurs because the original and the copy are printed on sheets of media capable of reflecting ultraviolet light (most standard copy paper is highly reflective of ultraviolet light), only using marking materials capable of being seen in white light (e.g., cyan, magenta, yellow, black (CMYK); red, green, blue (RGB), etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   printing an original using a printer by printing a first pattern within a second pattern on a first sheet of print media, said first pattern and said second pattern include relatively lighter markings within a relatively darker background, said relatively lighter markings appear at a first spacing interval in said first pattern, said relatively lighter markings appear at a second spacing interval that is larger than said first spacing interval in said second pattern, and said first pattern and said second pattern cover and equally block a region of said first sheet of print media from reflecting ultraviolet light;

scanning said original to produce a scanned image using a scanner, said scanner is only capable of detecting patterns of markings having a spacing interval larger than said first spacing interval causing said scanned image to not include said relatively lighter markings appearing at said first spacing interval;

printing said scanned image on a second sheet of print media to produce a copy of said original using said printer, said copy lacks markings at locations corresponding to where said relatively lighter markings appear at said first spacing interval in said original; and exposing said copy to ultraviolet light, said second sheet of print media reflects said ultraviolet light where said copy lacks markings.

2. The method according to claim 1, said ultraviolet light reflects where said copy lacks markings to cause said first pattern and said second pattern to appear different from one another to a human observer when said copy is exposed to said ultraviolet light.

3. The method according to claim 1, said first pattern and said second pattern in said region of said original appear the same to a human observer when said original is exposed to said ultraviolet light.

4. The method according to claim 1, said relatively lighter markings have a color more similar to sheets of media used to print said original and said copy, relative to said relatively darker background.

5. The method according to claim 4, further comprising exposing said copy to white light, said relatively lighter markings in said second pattern on said copy appear the same as locations where said copy lacks markings to a human observer when said copy is exposed to said white light.

6. The method according to claim 1, said relatively darker background contains the same pattern of markings and uses the same marking material in said first pattern and said second pattern.

7. The method according to claim 1, shape differences between a first area covered by said first pattern and a second area covered by said second pattern forms a complementary pair in said region of said original.

8. A method comprising:

determining a minimum resolution of a scanner;

setting a first spacing interval below said minimum scanner resolution;

setting a second spacing interval above said minimum scanner resolution;

establishing a first pattern and a second pattern, said first pattern and said second pattern include relatively lighter markings within a relatively darker background, said relatively lighter markings are established to appear at said first spacing interval in said first pattern, said relatively lighter markings are established to appear at said second spacing interval in said second pattern;

adding said first pattern within said second pattern to a document;

printing said document as an original on a first sheet of print media using a printer, said first pattern and said second pattern cover and equally block a region of said first sheet of print media from reflecting ultraviolet light;

scanning said original to produce a scanned image using a scanner, said minimum resolution of a scanner limits said scanner to only be capable of detecting patterns of markings having a spacing interval larger than said first spacing interval causing said scanned image to not include said relatively lighter markings appearing at said first spacing interval;

printing said scanned image on a second sheet of print media to produce a copy of said original using said printer, said copy lacks markings at locations corresponding to where said relatively lighter markings appear at said first spacing interval in said original; and exposing said copy to ultraviolet light, said second sheet of print media reflects said ultraviolet light where said copy lacks markings, said first sheet of print media and said second sheet of print media are capable of reflecting ultraviolet light, said original and said copy are printed only using marking materials capable of being seen in white light.

9. The method according to claim 8, said ultraviolet light reflects where said copy lacks markings to cause said first pattern and said second pattern to appear different from one another to a human observer when said copy is exposed to said ultraviolet light.

10. The method according to claim 8, said first pattern and said second pattern in said region of said original appear the same to a human observer when said original is exposed to said ultraviolet light.

11. The method according to claim 8, said relatively lighter markings have a color more similar to sheets of media used to print said original and said copy, relative to said relatively darker background.

12. The method according to claim 11, further comprising exposing said copy to white light, said relatively lighter markings in said second pattern on said copy appear the same as locations where said copy lacks markings to a human observer when said copy is exposed to said white light.

13. The method according to claim 8, said relatively darker background contains the same pattern of markings and uses the same marking material in said first pattern and said second pattern.

14. The method according to claim 8, shape differences between a first area covered by said first pattern and a second area covered by said second pattern forms a complementary pair in said region of said original.

15. A system comprising:

a processor;

a printer, operatively connected to said processor;

a scanner, capable of scanning sheets output by said printer; and an ultraviolet light source capable of illuminating sheets output by said printer, said processor is capable of controlling said printer to print an original by printing a first pattern within a second pattern on a first sheet of print media, said first pattern and said second pattern include relatively lighter markings within a relatively darker background, said relatively lighter markings appear at a first spacing interval in said first pattern, said relatively lighter markings appear at a second spacing interval that is larger than said first spacing interval in said second pattern, said first pattern and said second pattern cover and equally block a region of said first sheet of print media from reflecting ultraviolet light, said scanner is capable of scanning said original to produce a scanned image, said scanner is only capable of detecting patterns of markings having a spacing interval larger than said first spacing interval causing said scanned image to not include said relatively lighter markings appearing at said first spacing interval, said printer is capable of printing said scanned image on a second sheet of print media to produce a copy of said original, said copy lacks markings at locations corresponding to where said relatively lighter markings appear at said first spacing interval in said original, said ultraviolet light source is capable of exposing said copy to ultraviolet light, and said second sheet of print media reflects said ultraviolet light where said copy lacks markings.

16. The system according to claim 15, said ultraviolet light reflects where said copy lacks markings to cause said first pattern and said second pattern to appear different from one another to a human observer when said copy is exposed to said ultraviolet light.

17. The system according to claim 15, said first pattern and said second pattern in said region of said original appear the same to a human observer when said original is exposed to said ultraviolet light.

18. The system according to claim 15, said relatively lighter markings have a color more similar to sheets of media used to print said original and said copy, relative to said relatively darker background.

19. The system according to claim 18, further comprising a white light source capable of illuminating sheets output by said printer, said white light source is capable of exposing said copy to white light, said relatively lighter markings in said second pattern on said copy appear the same as locations where said copy lacks markings to a human observer when said copy is exposed to said white light.

20. The system according to claim 15, said relatively darker background contains the same pattern of markings and uses the same marking material in said first pattern and said second pattern.

* * * * *